United States Patent [19]

Lorenz

[11] Patent Number: 4,905,768
[45] Date of Patent: Mar. 6, 1990

[54] MANUAL AGRICULTURAL IMPLEMENT

[76] Inventor: Friedrich Lorenz, Hagerweg 3, 8183 Rottach-Egern, Fed. Rep. of Germany

[21] Appl. No.: 107,276

[22] Filed: Oct. 9, 1987

[30] Foreign Application Priority Data

Oct. 11, 1986 [DE] Fed. Rep. of Germany ... 8627051[U]

[51] Int. Cl.⁴ .............................................. A01B 1/14
[52] U.S. Cl. ..................... 172/25; 172/372; 172/378; 172/379; 172/765; 74/552
[58] Field of Search ............... 172/25, 378, 523, 522, 172/540, 371, 379, 111; 16/115, 111 R, 117; 56/400.02, 400.21; 74/543, 544, 557, 552, 488; 81/177.2, 177.5; 299/91; 175/32 D

[56] References Cited

U.S. PATENT DOCUMENTS

| 256,039 | 4/1882 | Peters | 175/320 |
|---|---|---|---|
| 264,138 | 9/1882 | Colvin | 172/25 |
| 274,108 | 3/1883 | Connor | 172/25 |
| 425,150 | 4/1890 | Stanley | 172/25 |
| 547,679 | 10/1895 | Read | 294/50.6 |
| T875,019 | 6/1970 | Haddad | 74/552 |
| 1,167,491 | 1/1916 | Gilson, Sr. | 56/400.21 |
| 1,232,539 | 7/1917 | Harrison | 56/400.21 |
| 1,323,680 | 12/1919 | Davidson | 74/557 |
| 1,537,005 | 5/1925 | Carson | 56/400.21 |
| 1,924,002 | 8/1933 | Rush | 294/50.6 |
| 2,082,476 | 6/1937 | Allen | 172/25 |
| 2,689,762 | 9/1954 | Krumm | 294/50.6 |
| 2,749,104 | 6/1956 | Barrett | 299/91 |
| 2,809,067 | 10/1957 | Macchi | 294/50.7 |
| 2,855,668 | 10/1958 | Ottenad et al. | 172/25 X |
| 3,129,771 | 4/1964 | Lidstone | 172/25 |
| 3,930,544 | 1/1976 | Foster, Sr. | 56/400.21 |
| 4,456,075 | 6/1984 | Hostetter | 172/25 |

FOREIGN PATENT DOCUMENTS

| 0073344 | 3/1976 | Australia | 172/25 |
|---|---|---|---|
| 0264711 | 4/1988 | European Pat. Off. | 172/25 |
| 0217405 | 2/1942 | Switzerland | 172/25 |

*Primary Examiner*—Randolph A. Reese
*Assistant Examiner*—Jeffrey L. Thompson

[57] ABSTRACT

A manual agricultural implement, having a shaft with an axis and two ends, a handle arranged at one of the ends of the shaft and a tool arranged at the other end of the shaft having a plurality of tines arranged at radial distances from the shaft, the tines extending around the shaft axis in a curved manner and along the surface of an imaginary cylinder which is coaxial to the shaft axis.

22 Claims, 4 Drawing Sheets

Fig.13
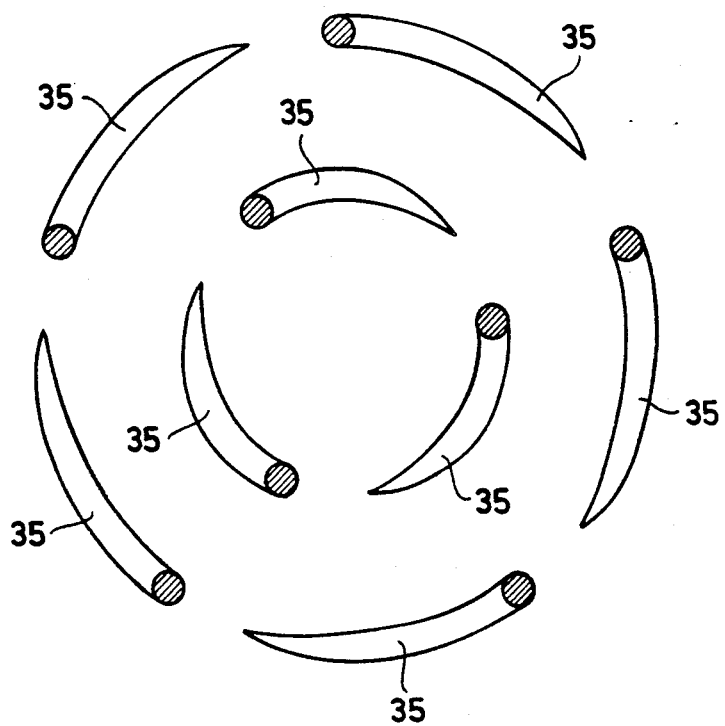
Fig.14 Fig.15 Fig.16
  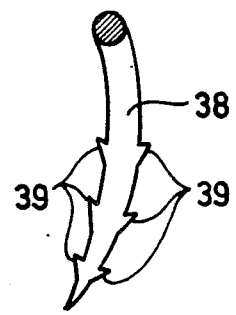

MANUAL AGRICULTURAL IMPLEMENT

BACKGROUND OF THE INVENTION

The present invention relates to a manual agricultural implement with a shaft, a handle arranged on one end of the shaft, and a tool provided with several tines and arranged on the other end of the shaft.

Devices for facilitating soil treatment which include several straight tines which are arranged near one another on a circular arc in radial distances around a shaft and which are inwardly inclined toward one another so as to engage into the soil are known. These devices have common problem, a large amount of power is required in order to accomplish the desired soil treatment, further, the power is often not sufficient to accomplish loosening of the soil especially for heavy soil. Also mixing of soil layers with dispersed peat and artificial manures is very non-uniform. Finally removal of peats simultaneously with the work treatment can not be performed in a satisfactory manner.

SUMMARY OF THE INVENTION

It is an object of the present invention to provide an agricultural implement which insures deep soil loosening, good mixing of soil layers with dispersed peat and manures, and an easy peat removal with elimination of a high power consumption.

In keeping with these objects and with others which will become apparent hereinafter, one feature of the present invention resides, briefly stated, in an agricultural implement in which the tines of the tool are curved spirally or helically around the shaft axis of the tool.

The tool of the new agricultural device can be introduced with its tines helically into the soil under the action of relatively low pressure on its handle and simultaneous rotation. There is a possibility to support the manual pressure by foot pressure on the connecting piece of the tines with the shaft. Finally, the tool can be pulled out from the soil vertically so that the ground will be left behind in crumbling form.

The insertion of the tines into the ground can be facilitated in that the tines are arranged along the surface of an imaginary cylinder which is connected to the shaft. Thereby each tine during an insertion into the ground follows the opening formed by its tip, without destroying new soil layers.

In dependence on the soil properties, it can be advantageous when the tines are curved so that the tips of the tines are arranged at the smaller distance from the shaft than their foot points. The tips extend practically along the surface of an imaginary outwardly open truncated cone. In some cases the tines after insertion into the ground form a cage, with which the ground can be lifted, or in the case of loose ground an improved crumbling can be performed. It is recommended to provide such an arrangement of the tines in which they extend along the surface of an imaginary open truncated cone, which can be favorable for many applications.

It is further advantageous when the tines are curved so that the lines connecting the tine foot points with the shaft and the tine tips with the shaft form an angle of approximately 90° with its apex at the axis of the shaft. The four tines formed thereby each occupying approximately a quarter winding of a spiral or a helical line. In such construction, the handling of the device is especially simple, since a quarter rotation by means of the handle can be easily performed and the device then penetrates into the soil with its full depth.

The inventive agricultural implement can basically use a tool which has two or any number of tines, arranged in uniform and/or non-uniform distances around the shaft. It is especially advantageous when the tool has three and at most five tines which are uniformly arranged around the shaft. With such construction the above-mentioned objects are achieved in a satisfactory manner without having a very high weight of the device.

It is also possible that the tines are arranged at different radial distances from the shaft. The operation is also facilitated when at least the tines feet have the same distances from the shaft.

In all cases the tines can be mounted on a plate or on an individual bar, and means can be provided for a releasable and rotation-secured connection of the plate or the bar with the shaft.

In accordance with an advantageous embodiment of the present invention, the handle of the device can include a rod which extends transversely to the shaft at both sides of the shaft over equal distances. For handling the device, it can be advantageous when the rod of the handle is longitudinally adjustable. Thereby, on the one hand, in the case of soils which are heavy to work the lever arm can be increased and therefore the force applied can be reduced. On the other hand, in the case of soil working around dense plants the handle can be shortened to provide an improved handling between the plants, in some cases with one hand. For facilitating the handling of the device, the ends of the rods of the handle can be provided with further, advantageously arcuate rod members which with respect to the vertical shaft, extend in a horizontal direction from the verticle shaft.

It's also possible to form the handle of the inventive device in a different manner, for example, as a wheel or a wheel segment which centrally surrounds the shaft.

The novel features of the present invention are set forth in particular in the dependent claims. The invention itself, however, can be best understood from the following description of the preferred embodiments which is accompanied by the following drawings.

BRIEF DESCRIPTION OF THE DRAWING

FIGS. 8-16 are views showing various cross-sections of tines of the tool of the agricultural implement in accordance with the present invention.

DESCRIPTION OF PREFERRED EMBODIMENTS

Figure 1:
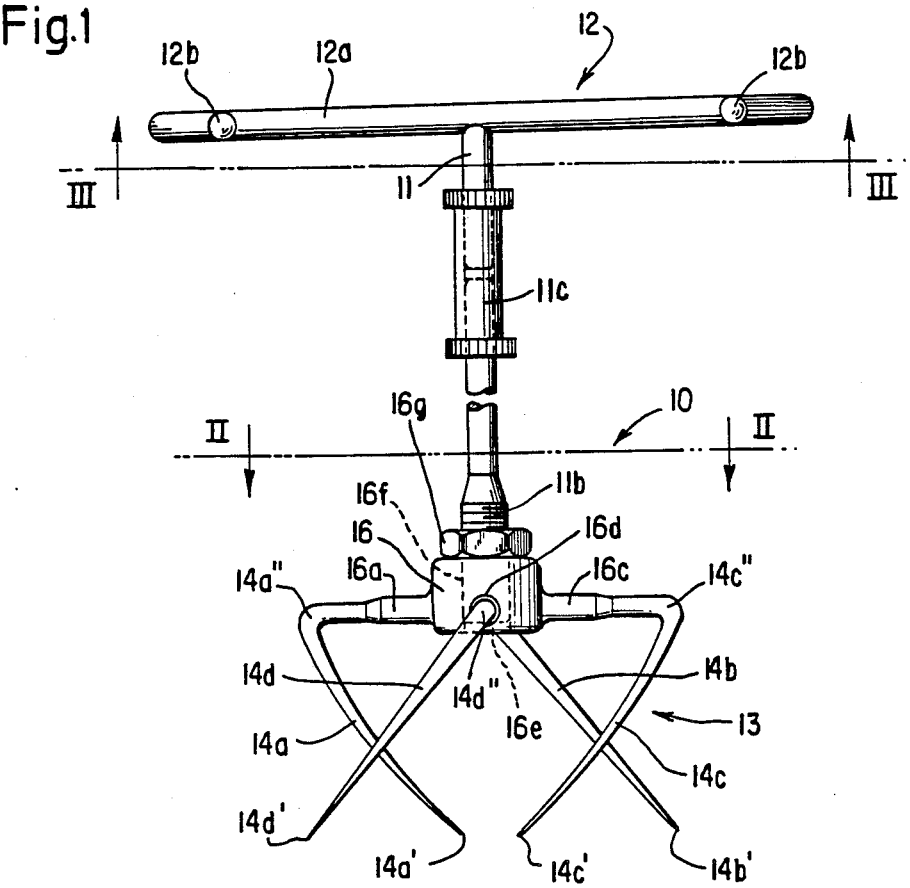
FIG. 1 is a side view of the agricultural implement or device in accordance with the present invention with a short shaft.

The soil treating implement shown in the drawings has a shaft 11 with a handle 12 at its upper end and a tool 13 at its lower end. The tool 13 has four tines 14a-14d. The tines are arranged at a distance from the shaft 11 around the shaft and extend in a curved manner spirally or helically around a shaft axis 11a.

Figure 2:
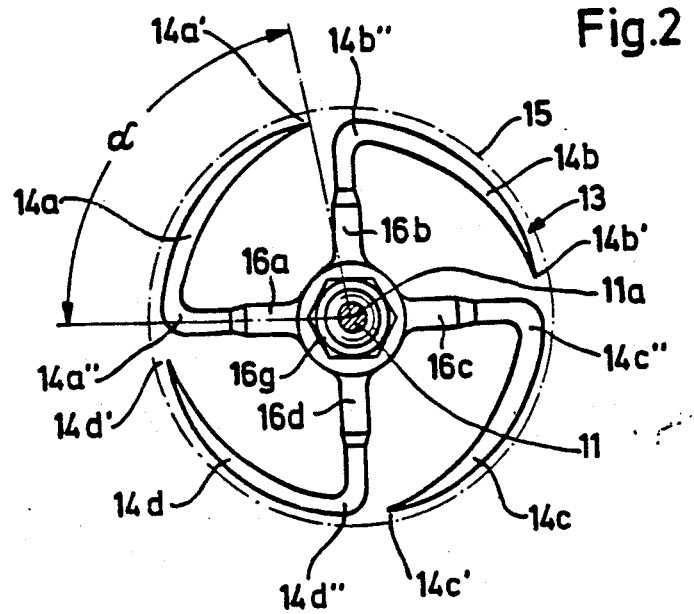
FIG. 2 is a view from above of the tool of the implement, as seen in a section taken along the line II—II in FIG. 1.

In the embodiment of the tool 13 shown in FIG. 2, the tines 14a-14d extend helically along the outer surface of an imaginary cylinder 15 which is coaxial to the shaft 11 and shown in dash-dot circular line.

As can further be seen from FIG. 2, the tines 14a-14d are curved so that tines connecting tine feet 14a''-14d'' and tine tips 14a'-14d' with the shaft axis 11a form and angle of approximately 90°. It is shown for example for the tine 14a. All tine feet 14a''-14d'' have the same distance from the shaft axis 11a.

The tines 14a-14d are releasably connected with the shaft 11 in the shown embodiment by means of bars 16a-16d. The bars are mounted on a connecting member 16 which has an inner opening 16e with a thread 16f. By means of the threads 16f, the connecting member 16 with the bars 16a-16d and tines 14a-14d can also be screwed on the lower end of the shaft 11, which is also provided with thread 11b. A counter nut 16g is also provided on the lower shaft end for securing.

As mentioned above, instead of the four bars 16a-16d, a plate can be used such that the tines 14a-14g are screwed on its periphery.

Figure 3:
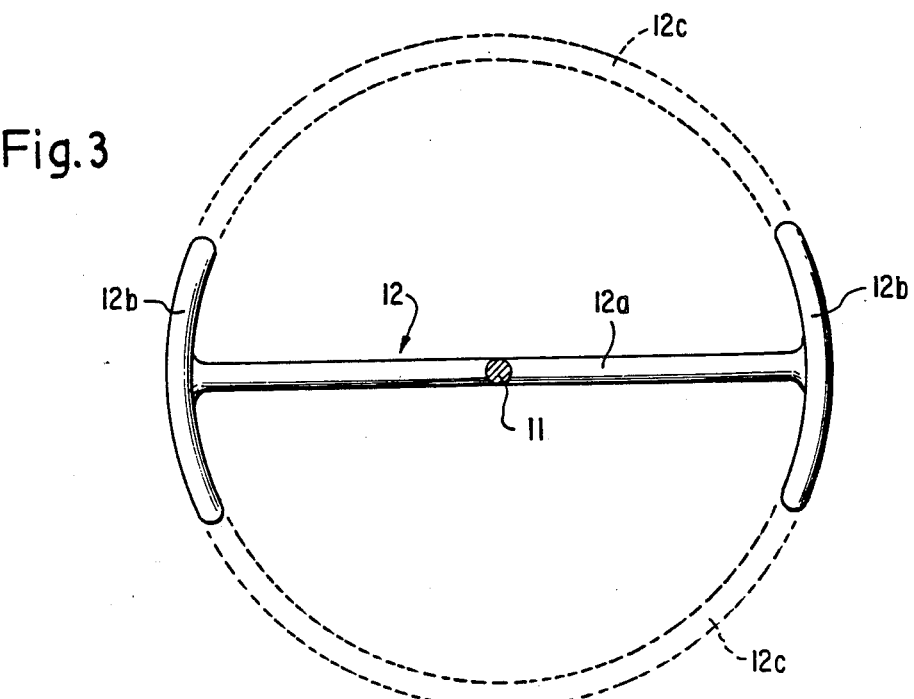
FIG. 3 is a view showing the handle of the implement from below in a section taken along the line III—III in FIG. 1.

The handle 12 shown in FIGS. 1-3 includes a rod 12a which extends transversely to the shaft 11 at both sides of the shaft and over the same length. When the shaft is vertical, two arcuate rods 12b extends horizontally at the ends of the rod 12a. Further, the arcuate portions 12b can be extended to form a complete wheel as illustrated by dashed line 12c in FIG. 3.

Figure 4:
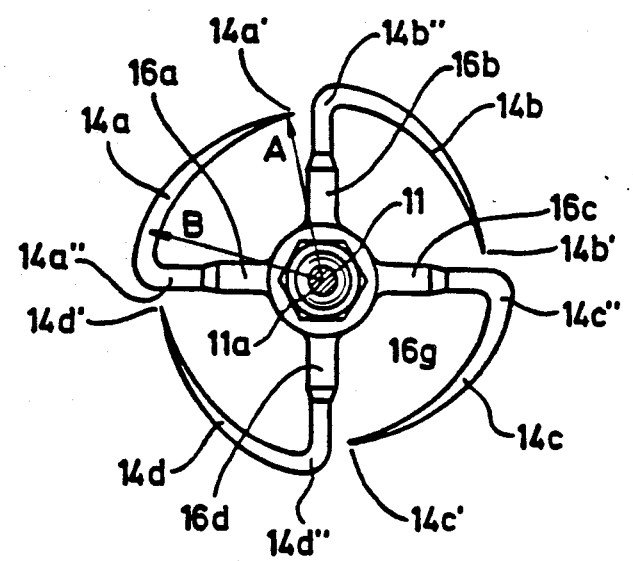
FIG. 4 is a view corresponding to the view of FIG. 2, but showing another embodiment of the tool of the implement in accordance to the present invention.

In the embodiment of tool 13 shown in FIG. 4, the tines 14a-14d are curved so that they extend spirally around the shaft axis 11a. The tine tips 14a'-14d' are spaced by a smaller distance A from the shaft 11 than the tine feet 14a''-14d'' whose distance from the shaft is identified as B.

Figure 5:
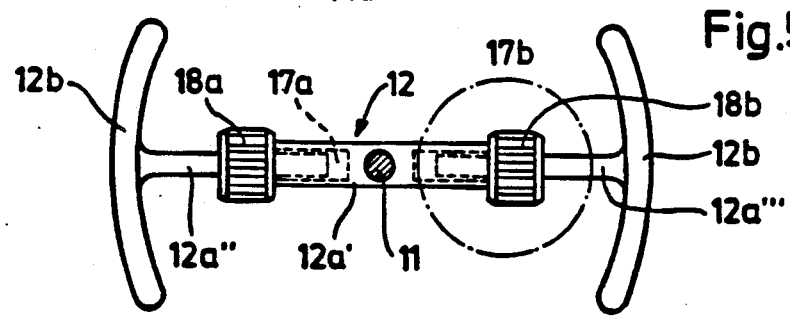
FIG. 5 is a view corresponding to the view of FIG. 3, but showing another embodiment of the handle of the implement in accordance with the present invention.
Figure 6:
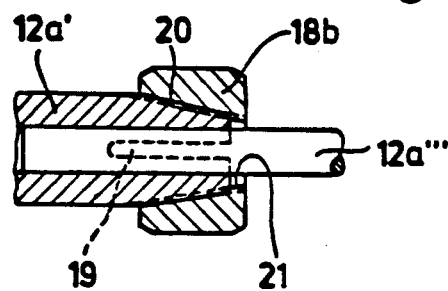
FIG. 6 is a view showing a fragment of FIG. 5 which is encircled by dash-dot line, for another embodiment of the handle.

FIGS. 5-6 show an embodiment of the handle 12 which is longitudinally adjustable. The rod 12a is subdivided into parts 12a', 12a'' and 12a'''. The rod part 12a' is provided with openings 17a and 17b extending from its ends towards its center. They serve for telescopably displaceable accommodation of the rod parts 12a'' and 12a''' and for their mounting in desired positions. The ends of the rod parts 12a' are also provided with two opposite longitudinal slots 19.

The rod part 12a' is also provided on its ends with a coaxial outer thread 20. Counter nuts 18a and 18b are screwed with their inner thread 21 on the outer thread 20. With such screwing, the slotted ends of the rod part 12a' can be so compressed so that the rod part 12a'' and 12a''' located in the opening 17a and 17b can be fixed in the desired position.

The operation of the inventive device is such that the tool 13 with the tines tips 14a'-14d' are placed onto the region of the land to be worked and then under a low pressure on the handle 12 and in some cases low foot pressure on one of the rods 16a-16d the tines 14a-14d are introduced into the soil with almost quarter-circular, helical movement. For loosening of the soil, the handle 12 is insignificantly rotated without pressure or with some pulling as needed for the insertion of the tines 14a-14d into the soil. After this the tool 13 of the device can be removed from the soil vertically. In many cases loosening of the soil can however be also produced such that the tool 13 is lifted from the soil after preliminary introduction of the tines 14a-d helically into the soil by less than approximately a quarter circle.

Figure 7:
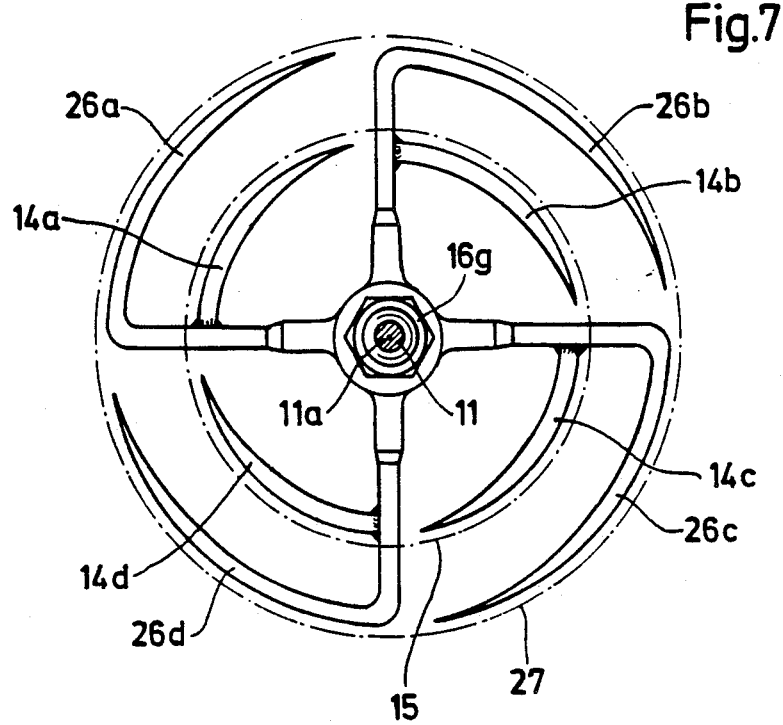
FIG. 7 is a view corresponding to the view of FIG. 2, but showing still a further embodiment of the invention.

In the embodiment shown in FIG. 7, the circular line on which the tines 14a-14d are arranged at equal distance from the shaft axis 11a is surrounded by a further set of tines 26a-d. The tines 26a-d extend downwardly on an outer circle, also at equal distance from the shaft axis 11a. They are arranged along the outer surface of an imaginary cylinder 27 coaxial to the shaft 11.

The diameter of the imaginary cylinder 27 corresponds substantially to 1.2-1.7 times the diameter of the inner cylinder 15.

Figure 8:
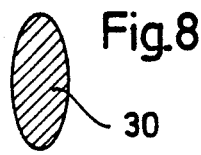
Figure 9:
Figure 10:
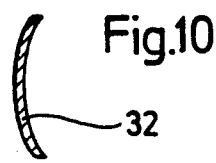

The full cross-section of the tines 14 and 26 shown in FIGS. 1 through 7 is for example circular. On the other hand, alternative cross-sections of the tines can be provided. FIG. 8 shows an oval cross-section 30 with smaller end faces in a direction of rotation. FIG. 9 shows a plow-shaped cross-section 31 of the tines. FIG. 10 shows a knife-like and somewhat curved cross-section 32 of the tines.

Figure 11:
Figure 12:

The tip line extending along the length of the tines in a movement direction is shown in FIG. 9 and FIG. 10. FIG. 11 shows a drop-like cross-section 33 of the tines. Finally, FIG. 12 shows a cross-like cross-section 34 of the tines. The tip lines of each cross-section extending in the longitudinal direction of the tines in the direction of rotation can be twisted relatively to an axis of the respective tine by 90°, 180° or 360°.

FIG. 14 shows a S-shaped cross-section 36. FIG. 15 shows a half-moon cross-section 37. In the embodiment according to FIG. 16 barbs 39 extend from the tines 38 in pairs.

Some exemplary advantages of the inventive device are as follows: plowing of the soil can be performed with significantly lower power consumption as compared with known devices. The soil is loosened to fine grains, while with known devices frequently soil clods are produced which subsequently must be destroyed. Also deep-root weeds can be pulled from the soil without difficulty by the deep soil loosening. The roots of these weeds in contrast to working with harrow and hoe, are seldom damaged, so that the weeds can be pulled out together with the soil. When it is necessary to treat peat or synthetic manure in the soil, the inventive device provides for a uniform mixing.

In special cases it can also be advantageous when the tool of the device is lifted not vertically from the soil as described above, but the shaft is first somewhat inclined and the tool is pulled out either in this direction, or after straightening of the shaft.

The inventive device can also be formed with some deviations from the embodiment shown in the drawings. It should be mentioned that in the shown embodiments the shaft of the device has a length which is conventional for normal harrows, so that the device can work in standing position. In the case of the smaller cultivation, it can be desirable to make the device with a shorter shaft so that it is possible to work within bending, squatting or buckling positions. Moreover, it is possible to mount on the shaft such tools which have the number of the tines or the distance of the tines from the shaft or a longitudinally adjustable shaft as illustrated by the optional telescoping attachment 11c in FIG. 1 corresponding to respective work to be performed. By the last feature, an adaptation of the device to the soil treatment in the rows of plants can be provided. If, for example there is a loose soil with low soil plants, the device with shortened shaft and handle can be designed for handling with one hand.

The invention is not limited to the details shown, since various modifications and structural changes are possible without departing in any way from the spirit of the present invention.

What is desired to be protected by Letters Patent is set forth in particular in the appended claims.

I claim:

1. A manual agricultural implement, comprising:
   a shaft having a central axis of rotation and two ends;
   a handle arranged at one of said ends of said shaft; and
   a tool at the other of said ends of said shaft, said tool having a plurality of elongated tines arranged at radial distances from said shaft, said tines extending around said central axis in a curved manner and along a surface of an imaginary cylinder coaxial to said axis, wherein each of said tines has a base and a body, said base extending radially outward from said axis and said body extending along the surface of said imaginary cylinder, said tine including a transition zone connecting a footpoint of said body to said base, said body terminating in a ground engaging tip, said body defining an arc between said footpoint and said tip.

2. A manual agricultural implement as defined in claim 1, wherein said tines of said tool extend helically around said axis.

3. A manual agricultural implement as defined in claim 1, wherein said plurality of tines includes between three and five tines which are uniformly distributed around said shaft.

4. A manual agricultural implement as defined in claim 1, wherein said tines are arranged around and extend along the surfaces of said shaft at least two concentric imaginary cylinders of different diameters.

5. A manual agricultural implement as defined in claim 1, wherein the footprints of said tines are located on a circle concentric with said axis.

6. A manual agricultural implement as defined in claim 1, and further comprising a plurality of bars to which the bases of said tines are releasably mounted and rotationally secured, wherein said bars are connected with said shaft.

7. A manual agricultural implement as defined in claim 1, wherein said shaft is longitudinally adjustable.

8. A manual agricultural implement as defined in claim 1, wherein said handle includes a rod extending transversely to said said shaft at an equal length on both sides of said shaft.

9. A manual agricultural implement as defined in claim 1, wherein said handle is formed as a wheel which centrally surrounds said shaft.

10. A manual agricultural implement as defined in claim 1, wherein said handle is formed as a plurality of wheel segments.

11. A manual agricultural implement as defined in claim 1, wherein said handle is formed as a rod which is longitudinally adjustable.

12. A manual agricultural implement as defined in claim 11, wherein said rod has two opposite ends, and said handle further includes two end members each arranged on a respective end of said rod, said end members lying in a plane substantially perpendicular to said central axis.

13. A manual agricultural implement as defined in claim 12, wherein said end members are arcuate.

14. A manual agricultural implement as defined in claim 1, wherein said tines have a circular cross-section.

15. A manual agricultural implement as defined in claim 1, wherein said tines have an oval cross section.

16. A manual agricultural implement as defined in claim 1, wherein said tines have a plow-shaped cross section.

17. A manual agricultural implement as defined in claim 1, wherein said tines have knife-like cross section.

18. A manual agricultural implement as defined claim 1, wherein said tines have a drop-like cross section.

19. A manual agricultural implement as defined claim 1, wherein said tines have a cross-like shape cross section.

20. A manual agricultural implement, comprising:
    a shaft having a central axis of rotation and two ends;
    a handle arranged at one of said ends of said shaft; and
    a tool at the other of said ends of said shaft, said tool having a plurality of elongated tines arranged at radial distances from said shaft, said tines extending around said central axis in a curved manner and along a surface of an imaginary cone coaxial to said axis, wherein each of said tines has a base and a body, said base extending radially outward from said axis and said body extending along the surface of said imaginary cone, said tine including a transition zone connecting a footpoint of said body to said base, said body terminating in a ground engaging tip, said body defining an arc between said footpoint and said tip.

21. A manual agricultural implement as defined in claim 20, wherein said tines of said tool extend spirally around said axis.

22. A manual agricultural implement, comprising:
    a shaft having a central axis of rotation and two ends;
    a handle arranged at one of said ends of said shaft; and
    a tool at the other of said ends of said shaft, said tool having a plurality of elongated tines arranged at radial distances from said shaft, said tines extending around said central axis in a curved manner and along a surface of an imaginary cylinder coaxial to said axis, wherein
    each of said tines has a base and a body, said base extending radially outward from said axis and said body extending along the surface of said imaginary cylinder, said tine including a transition zone connecting a foot point of said body to said base, said body terminating in a ground engaging tip, said body being curved so that a first line perpendicular to said axis connecting said foot point with said axis and a second line perpendicular to said axis connecting said tip with said axis together define an approximately 90° arc about said central axis.

* * * * *

UNITED STATES PATENT AND TRADEMARK OFFICE
CERTIFICATE OF CORRECTION

PATENT NO. : 4,905,768
DATED : March 6, 1990
INVENTOR(S) : Friedrich Lorenz

It is certified that error appears in the above-indentified patent and that said Letters Patent is hereby corrected as shown below:

Column 5, line 33, after "tip" insert --spanning approximately 90° around the circumference of said imaginary cylinder--.
    line 42, after "around" delete "and".
    line 43, change "extend along the surfaces of said shaft" to --said shaft and extend along the surfaces of--.
    line 46, change "footprints" to --footpoints--.

Column 6, line 41, after "tip" insert --spanning approximately 90° around the circumference of said imaginary cone, said tines being curved so that their tips are spaced by a smaller distance from said central axis than their footpoints--.
    line 64, change "are" to --arc--.

Signed and Sealed this

Nineteenth Day of April, 1994

BRUCE LEHMAN

Attest:

Attesting Officer    Commissioner of Patents and Trademarks